(12) United States Patent
Mahony et al.

(10) Patent No.: US 8,147,065 B2
(45) Date of Patent: Apr. 3, 2012

(54) ELECTRONICALLY CONTROLLED FILM TRANSPORT METHODS AND SYSTEMS

(75) Inventors: Gary James Mahony, Toronto (CA); George Mario Dalle Ave, Oakville (CA)

(73) Assignee: IMAX Corporation, Ontario (CA)

( * ) Notice: Subject to any disclaimer, the term of this patent is extended or adjusted under 35 U.S.C. 154(b) by 1260 days.

(21) Appl. No.: 10/594,370

(22) PCT Filed: Apr. 20, 2005

(86) PCT No.: PCT/IB2005/001049
§ 371 (c)(1),
(2), (4) Date: May 16, 2007

(87) PCT Pub. No.: WO2005/103811
PCT Pub. Date: Nov. 3, 2005

(65) Prior Publication Data
US 2008/0088798 A1    Apr. 17, 2008

Related U.S. Application Data

(60) Provisional application No. 60/563,785, filed on Apr. 20, 2004.

(51) Int. Cl.
*G03B 1/42* (2006.01)
*B65H 23/18* (2006.01)
(52) U.S. Cl. .................. 352/159; 352/168; 352/187
(58) Field of Classification Search .................. 352/184, 352/187, 188, 189, 192, 191, 159, 166, 168, 352/180, 181, 182, 183, 197
See application file for complete search history.

(56) References Cited

U.S. PATENT DOCUMENTS

| 3,494,524 A | | 2/1970 | Jones | |
|---|---|---|---|---|
| 3,600,073 A | * | 8/1971 | Shaw | 352/184 |
| 3,635,548 A | * | 1/1972 | Thomsen et al. | 352/79 |
| 3,794,415 A | * | 2/1974 | Jones | 352/184 |
| 3,819,258 A | | 6/1974 | Butler et al. | |
| 4,022,525 A | | 5/1977 | Boudouris | |
| 4,029,405 A | * | 6/1977 | Stutz | 352/6 |

(Continued)

FOREIGN PATENT DOCUMENTS

CA        2 253 596        3/2003

(Continued)

OTHER PUBLICATIONS

Ray Zone, 'riding on digits, nWave Pictures is finding new markets for 3D digital films with multifaceted business model that provides flexibility in a challenging economy.' The Big Frame, pp. 36-44, Spring 2004.

(Continued)

*Primary Examiner* — William C Dowling
(74) *Attorney, Agent, or Firm* — Kilpatrick Townsend & Stockton LLP

(57) ABSTRACT

Electronically controlled film transport methods and systems are described. One system described comprises a film transport path for transporting film, an input drive assembly for advancing film through the film transport path, an output drive assembly for advancing film out of the film transport path, an aperture positioned in the film transport path, at least one registration pin capable of engaging at least one perforation in the film to secure a portion of the film in the aperture, wherein the at least one registration pin is capable of retracting to a non-engaging position, and a controller for controlling the retraction of the at least one registration pin.

26 Claims, 9 Drawing Sheets

U.S. PATENT DOCUMENTS

| | | | | |
|---|---|---|---|---|
| 4,039,256 A | * | 8/1977 | Teeple et al. | 352/184 |
| 4,114,996 A | * | 9/1978 | Shaw | 352/184 |
| 4,180,194 A | * | 12/1979 | McCombie et al. | 226/113 |
| 4,253,749 A | * | 3/1981 | Boudouris | 352/187 |
| 4,697,896 A | | 10/1987 | Fox | |
| 5,050,985 A | | 9/1991 | Shaw et al. | |
| 5,110,201 A | | 5/1992 | Haas | |
| 5,341,182 A | | 8/1994 | Schmidt | |
| 5,423,467 A | * | 6/1995 | Blanding | 226/3 |
| 5,587,750 A | | 12/1996 | Gibbon et al. | |
| 5,633,696 A | | 5/1997 | Schmidt | |
| 5,875,020 A | | 2/1999 | Kitten et al. | |
| 6,120,151 A | | 9/2000 | Stitt | |
| 6,257,752 B1 | | 7/2001 | Browne | |
| 2003/0048419 A1 | | 3/2003 | Goodhill et al. | |
| 2004/0165149 A1 | * | 8/2004 | Holst, Jr. | 352/152 |

FOREIGN PATENT DOCUMENTS

| | | |
|---|---|---|
| WO | WO9306520 | 4/1993 |
| WO | WO 98/44388 | 10/1998 |

OTHER PUBLICATIONS

Supplemental European Search Report dated Sep. 30, 2009 in related European Application No. 05732774.4.

International Search Report and Written Opinion dated Sep. 21, 2005 in related Application No. PCT/IB2005/001049.

* cited by examiner

ELECTRONICALLY CONTROLLED FILM TRANSPORT METHODS AND SYSTEMS

CROSS-REFERENCE TO RELATED APPLICATION

This application is the U.S. national phase of International Application No. PCT/I32005/001049 filed on Apr. 20, 2005 and published in English on Nov. 3, 2005 as International Publication No. WO 2005/103811 A1, which application claims the benefit of U.S. Provisional Application Ser. No. 60/563,785 filed on Apr. 20, 2004 entitled "Electronically Controlled Film Loop Advancing Projector," the contents of which are incorporated by reference herein.

FIELD OF THE INVENTION

The present invention relates generally to film transport and, more particularly, to electronically controlled film transport methods and systems.

BACKGROUND

The projection of motion picture film generally requires a device that can transport individual film frames from a film supply system to a projection aperture at some defined rate. Typically, the standard rate is 24 frames per second. The individual frames, while supplied at a constant rate from the film supply platter, must be decelerated near the vicinity of the projection aperture and held stationary while light is passed through the film and projected onto the screen.

Various devices and methods are known for moving film intermittently for registration at the projection aperture. For example, the Geneva mechanism moves film one frame at a time into the projection aperture by the application of an intermittent force applied on the perforations of the film.

Other examples of methods and systems of advancing film use electronic means to intermittently drive a film advance sprocket, such as described in U.S. Pat. Nos. 3,819,258, 4,022,525, 4,697,896, 5,011,201, and 5,875,020. For example, U.S. Pat. No. 3,819,258 describes an improvement to a motion picture system in which an intermittent sprocket for advancing the film is driven by a servo-motor controlled by signals from optical encoders. The advance cycle is divided into two phases; one for rapidly advancing the film frame into an approximate final position, and a second fine positioning phase where the servo motor positions the frame precisely at the projection aperture.

U.S. Pat. No. 4,022,525 describes another film advance method and system using an electronically driven sprocket wheel in which two different driving systems are used to drive a servo-motor attached to the film advance sprocket. The first system is a velocity controlled servo system in which the servo-motor is controlled by a predetermined velocity profile. When the sprocket advances the film frame to the projection aperture, the servo stops and control circuitry switches to a position controlled servo system for preventing movement of the film in the projection aperture.

U.S. Pat. No. 4,697,896 describes another film advance method and system using an electronically driven sprocket wheel in which there is a period of rapid acceleration of the sprocket, followed by rapid deceleration, and finally by a fine-position adjusting phase. The driving circuit includes using sprocket position sensing to give position and timing feedback for the circuit to refine the amount of current applied in subsequent drive cycles.

U.S. Pat. No. 5,110,201 describes yet another film advance method and system of using an electronically driven sprocket in which the transport of a film frame takes place over three distinct phases: a brief acceleration phase, a longer and gentler deceleration phase, and a final position adjusting phase. Maintaining the sprocket teeth against the leading edge of the perforations reduces stressful impact on the film during the acceleration phase. By providing a longer, smoother deceleration phase the method achieves the desired goals of reducing objectionable noise and excessive wear on the film.

U.S. Pat. No. 5,875,020 describes a motion picture system in which two intermittently driven sprockets, one on each side of the projection aperture, are driven synchronously to advance film frames into the projection aperture. The use of friction or registration pins at the projection aperture to decelerate the film is avoided in this system, because the two drive sprockets control the deceleration and final positioning of the film frame at the projection aperture.

A disadvantage of conventional motion picture projection systems featuring intermittent film advance sprockets can be that they function as both a means to advance film into the projection aperture and as a means of registering the film at the aperture. The latter function requires the intermittent sprocket to come to a complete stop every film advance cycle to prevent movement of the film frame during projection. The end of the film frame exposure period is the starting point for the next cycle, thus requiring the sprocket to rapidly accelerate, and subsequently rapidly decelerate so that there is time to move the film the required distance towards the projection aperture. The intermittent rapid acceleration and deceleration of the film may cause considerable wear at the perforations. In the case of large format film, such as 70 mm film with a frame width of 15 perforations, the wear can be excessive and lead to the rapid destruction of the film.

Another disadvantage of conventional electronically driven intermittent sprockets can be their variability in precision over time. This may be compounded by potential mechanical dimensional errors in the sprocket assembly, bearing play, and the variability in perforation pitch of film prints. These types of systems can require elaborate position measuring systems and/or timing during the frame advance cycle for fine-tuning of the position of the film within the film gate. This latter solution can subtract time from the acceleration/deceleration phase, thereby creating the need for yet higher accelerations in the shortened time period.

One system and method of intermittent film transportation that can reliably move large format film is the rolling loop system and method as described, for example, in U.S. Pat. No. 3,494,524. Generally, with rolling loop systems film frames are advanced by intermittently creating film loops well in advance of the projection aperture and then smoothly rolling the loops towards the gate. Despite the fact that a rolling loop mechanism is relatively gentle in transporting film frames, it has been found that there is a need for supplemental deceleration of the film before it is registered on fixed pins near the projection aperture.

For example, U.S. Pat. Nos. 3,600,073 and 5,050,985 discuss supplemental deceleration mechanisms that, when combined with a rolling loop film transport device, provide an effective and reliable method of transporting and projecting large film formats, including the 70 mm 15 perforation format. Another rolling loop film movement, described, for example, in U.S. Pat. No. 5,587,750, utilizes a smaller rotor to advance the film loops.

All the rolling loop systems mentioned above achieve film advance timing by mechanical means. An important feature of the rolling loop film movements is the fact that the projected images can be an order of magnitude steadier in the projection aperture than they would be using conventional intermittent sprocket and Geneva movements. Rolling loop projection systems can also project images with much greater illumination efficiency than the Geneva and electronic intermittent sprocket film advance movements.

Some conventional rolling loop projection systems advance rolling film loops by means of a rotating circular rotor with film loop gaps. Other rolling loop projection system systems advance film loops linearly. For example, one system is described in U.S. Pat. Nos. 5,341,182 and 5,633,696 and another is described in U.S. Pat. Nos. 6,120,151 and 6,257,752. These linear film loop-advancing systems do not use a circular rotor.

There are several disadvantages with the conventional rolling loop film movements mentioned above. The deceleration cam, while reliable, is expensive to fabricate, to assemble, to set up in the projection system, and to maintain. In addition, film that tails out through the rolling loop movement can cause the deceleration cam timing to change. Should this occur, a trained service technician may need to be dispatched to the theatre to re-align the deceleration cam timing. Partly because of the relative complexity of the cam deceleration device and presence of fixed registration pins, these conventional systems can require specially trained staff for loading and operating the projection system, which adds to the overall expense of operating the motion picture theatre.

There also may be capability limitations of the mechanical rolling loop film movements that make such features as autoloading film and rewinding film through the projection system head very difficult or not practical to implement. This is primarily because of the way the fixed registration pins and the deceleration cam pins are typically integrated into the projection system film movement system.

Another limitation of these conventional film loop projection systems caused by the fixed mechanical timing relationship between the projection system film input sprocket and the deceleration cam pins precludes the capability of quickly and easily converting the projection system to advance alternate film formats such as 70 mm 8 perforations or 10 perforations, in the case of a 70 mm rolling loop projection system.

In addition to having decelerating cam pins another typical feature of the circular rolling loop projection system may be an air jet system that intermittently applies properly positioned blast of air at the right time laterally to the film at the point where the film loops first begin to form. The air pressure acts to prevent longitudinal bending of the filmstrip that would otherwise interfere with the proper creation of lateral bends of the film loops. A conventional air jet system may include an air compressor, a distribution manifold and a network of copper air tubes attached to the rotor for supplying air pressure at each of the rotor gaps where film loops are initiated. The air jet system may require a significant amount of compressed air that adds to the system cost in terms of space required, the additional equipment required, and the need for regular maintenance. These larger air compressors tend to be very noisy, hence, require an additional sound proofing enclosure.

SUMMARY OF THE INVENTION

Embodiments of the present invention comprise electronically controlled film transport methods and systems. One embodiment of a system of the present invention comprises a film transport path for transporting film, an input drive assembly for advancing film through the film transport path, an output drive assembly for advancing film out of the film transport path, an aperture positioned in the film transport path, at least one registration pin capable of engaging at least one perforation in the film to secure a portion of the film in the aperture, wherein the at least one registration pin is capable of retracting to a non-engaging position, and a controller for controlling the retraction of the at least one registration pin.

Another embodiment of a system of the present invention comprises a film transport path for transporting film, an input drive assembly for advancing film through the film transport path, wherein the input drive assembly comprises a variable speed drive assembly, an output drive assembly for advancing film out of the film transport path, an aperture positioned in the film transport path, at least one registration pin capable of engaging at least one perforation in the film to secure a portion of the film in the aperture, a rotor having at least one rotor gap, wherein the film forms a film loop in the rotor gap and the rotor gap is capable of moving the film loop to engage and disengage the film from the at least one registration pin, and a controller for controlling a speed profile of the variable speed drive assembly to control a speed at which the film is fed into the rotor gap to form the film loop.

These illustrative embodiments are mentioned not to limit or define the invention, but to provide one example to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF DRAWINGS

These and other features, aspects, and advantages of the present invention are better understood when the following Detailed Description is read with reference to the accompanying drawings, wherein:

FIG. 11 is a schematic of one embodiment of a registration pin assembly

DETAILED DESCRIPTION

Figure 1:
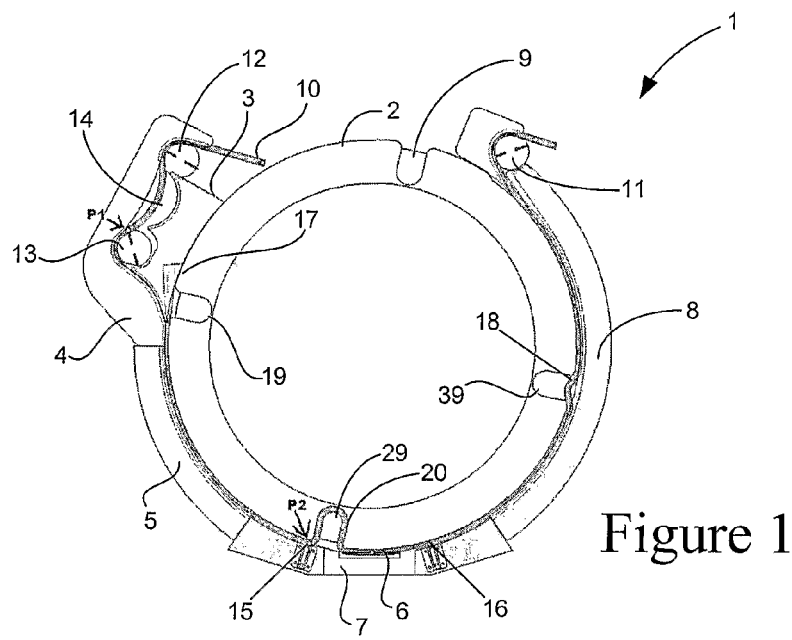
FIG. 1 is a schematic showing one embodiment of the film transport system as a loop of film is registered on a fixed input registration pin.

Embodiments of the present invention comprise electronically controlled film transport methods and systems. There are multiple embodiments of the present invention. By way of introduction and example, one illustrative embodiment of the present invention provides a rolling loop motion picture projection system including a film transport system with an input drive assembly. In one embodiment, the input drive assembly includes a programmable servo driven input feed sprocket and variable speed input feed sprocket for feeding film into a film transport path between a stator and a rotor. The film transport system also includes an output drive assembly having a programmable servo driven output sprocket. The input drive assembly including the variable speed input feed sprocket and the output drive assemble are controlled by a controller.

The variable speed input feed sprocket allows for film acceleration and deceleration within each film advance cycle. The rotor includes gaps that allow the formation of film loops within the gaps. The film loops that form within the rotor gaps are advanced by the rotor gaps towards an aperture where the film is registered on fixed registration pins for subsequent projection onto a screen. The variable speed input feed sprocket allows the film transport system to reliably project large format motion pictures without the expensive mechanical cam device to decelerate the film. The variable speed input feed sprocket also can allow film to be fed at a different rate onto the input registration pin during a film frame advance cycle, which can enable different film formats to be used with the projection system and re-align framing of misaligned film frames.

In one embodiment, the film transport system includes an input registration pin and an output registration pin that can move in the pin's axial direction, but cannot move up and down and sideways. This allows for the registration pins to be retracted during auto-film loading, film tail-out, rewinding operations, and during a sudden physical film failure. A controller controls the retraction of the registration pins. A film transport system with electronically controlled registration pins can be used in a film loop projection system or any other suitable electronically controlled film advance transport system. In one embodiment, the rotor center is positioned inline with the optical axis of the projection system projection lens and the input registration pin is located further away from the aperture than a convention film loop projection system in order to maintain stable and reliable positioning of the film in the projection aperture.

In one embodiment, the projection system includes a single stator-based air jet system that uses air flow directing surfaces extending into the open space of the rotor to precisely apply air pressure onto the film at the time of initial film loop formation. This air jet system can reduce the amount of compressed air required to assist in film loop formation and to reduce the complexity of the compressed air system within the projection system.

The above introduction is given to introduce the reader to the general subject matter of the application. By no means is the invention limited to such subject matter. Illustrative embodiments are described below.

Figure 2:
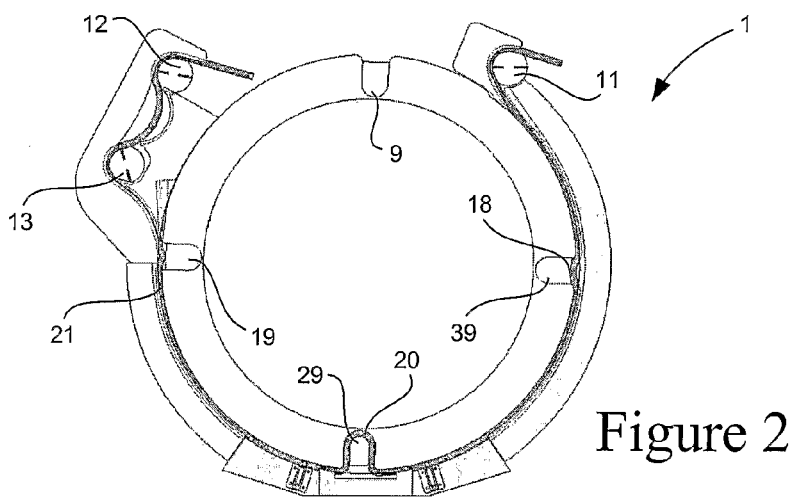
FIG. 2 is a schematic showing one embodiment of the film transport system as a loop of film starts to lay a new frame of film down at the projection aperture.
Figure 3:
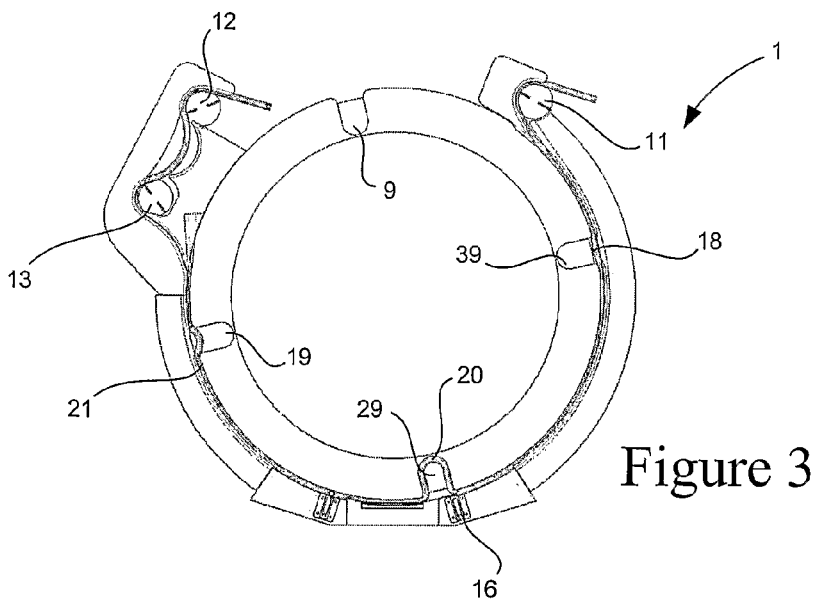
FIG. 3 is a schematic showing one embodiment of the film transport system just after the film loop has passed the projection aperture.

Referring to FIG. 1, an illustrative embodiment of a four-gap rolling loop film transport system 1 is illustrated schematically. This exemplary rolling film loop transport system 1 includes a film loop transport. As shown in FIGS. 1-3 the film loop transport includes a rotor 2 with four equally spaced peripheral gaps 9, 19, 29, 39. The film 10 may form loops in the gaps 9, 19, 29, 39, such as film loop 20. In another embodiment, the film loop transport may be a linear loop transport as described in U.S. Pat. Nos. 5,341,182 and 5,633,696, incorporated herein by this reference. Mounted within close proximity to the outer circumference of rotor 2 are a number of stationary parts that confine film 10 to a predefined space and film transport path. These stationary parts may consist of an outer guide 4, an inner guide 3, an input stator segment 5, an aperture block assembly 7, and an output stator segment 8. In one embodiment, an input drive assembly, an output drive assembly, and the rotor 2 advance the film 10. The input drive assembly may include two sprockets—the constant speed input sprocket 12 and the variable speed input feed sprocket 13 and the output drive assembly may include a constant speed output sprocket 11. Other embodiments may use more or less sprockets. The sprockets 11, 12, 13 and rotor 2 each may be driven by a servo-controlled motor (shown in FIG. 4). Each of these motors may include a positional feedback device (shown in FIG. 4) such as an encoder that provides information of the rotation of the sprockets 11, 12, 13 and rotor 2.

The film transport system 1 may include an aperture block assembly 7 that has an input registration pin 15 located at the input side of the projection aperture 6, and an output registration pin 16 located at the output side of the projection aperture 6. The input and output registration pins 15, 16 act to properly position the film 10 in a stopped position while the frame image is being projected through the projection aperture 6. In one embodiment, an air jet assembly 17 is built into the inner guide 3 to help to prevent the longitudinal bending of the film and assist with initial forming of the film loops in the rotor gaps 9, 19, 29, 39.

Figure 4:
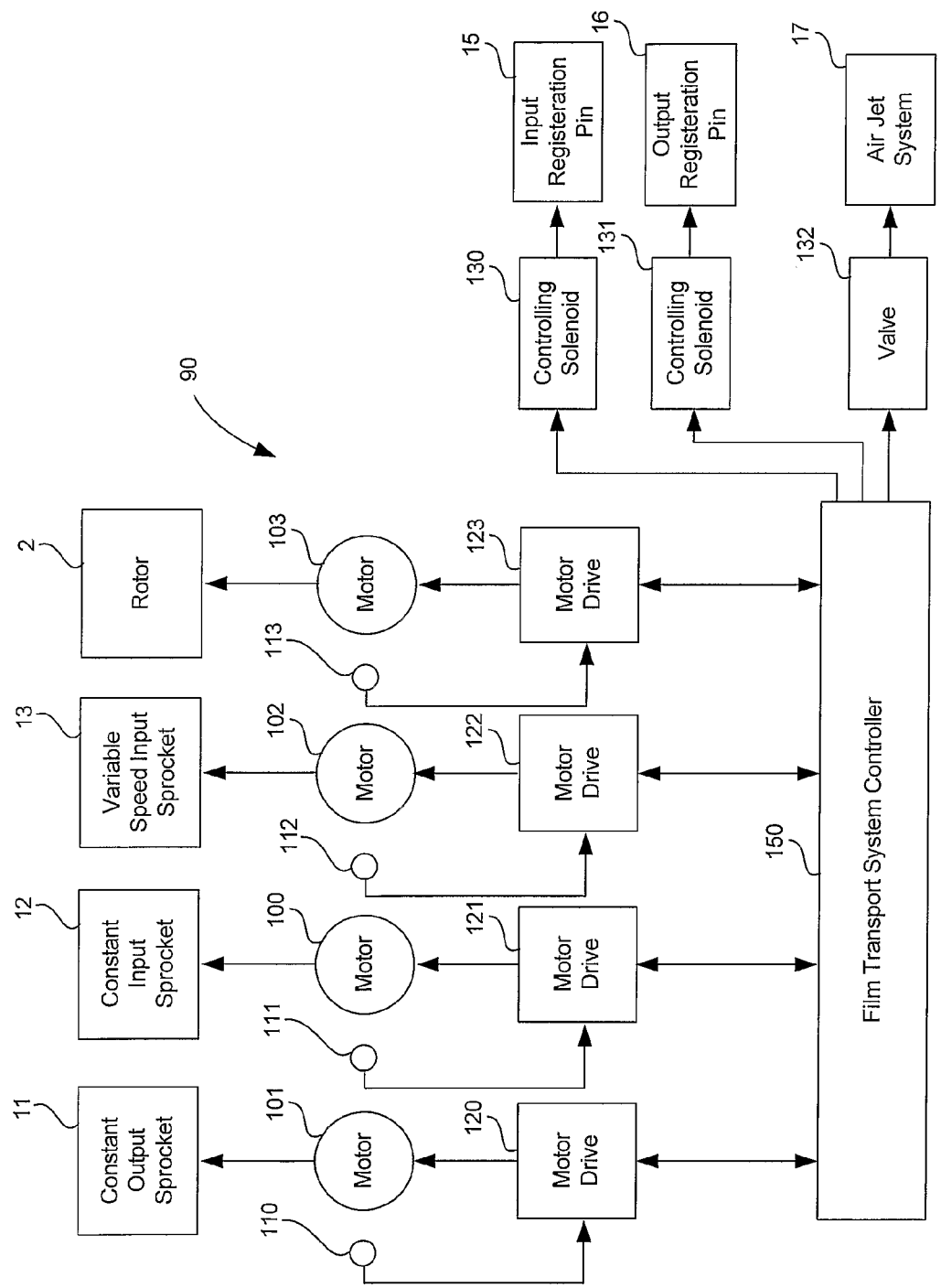
FIG. 4 is a block diagram of one embodiment of a control system of the film transport system.

FIG. 4 is diagram of an illustrative control system 90 of the film transport system 1 for controlling certain aspects of the film transport system. The rotor 2 and sprockets 11, 12, 13, shown in FIG. 1, are driven by a motor 100, 101, 102, and 103 respectively, as shown in FIG. 4. In one embodiment, each of the motors 100, 101, 102, and 103 is equipped with positional feedback sensors 110, 111, 112, and 113 respectively, such as an encoder. Each motor 100, 101, 102, 103 is controlled by a motor drive 120, 121, 122, and 123 respectively. The motor drives 120, 121, 122, and 123 receive control signals from a film transport system controller 150. The film transport system controller can receive the positional information from each of the motor drives 120, 121, 122, and 123 via the positional feedback sensors 110, 111, 112, and 113 and can determine and send control signals to the motor drives 120, 121, 122, and 123 accordingly.

The control system 90 may also include controlling solenoids 130 and 131 and valve 132. The controlling solenoids 130 and 131 can control the movement and position (retracted or engaged position) of the input registration pin 15 and output registration pin 16 respectively, as shown in FIG. 1. The controlling solenoids 130, 131 can be controlled by control signals received from the film transport controller 150. The valve 132 can control compressed air to air jet assembly 17, shown in FIG. 1. The valve can be controlled by control signals from the film transport system controller 150. There are a number of other sensors and actuators in the projection system that may be connected to and controlled by the film transport controller 150, but are not shown here to maintain simplicity.

Turning again to FIGS. 1-3, in one embodiment, during a motion picture presentation where the film 10 is being advanced by the film transport system 1, the film is first drawn into the film transport system from a film supply system (not shown) such as a reel unit or loop cabinet by the constant speed input sprocket 12. The constant speed output sprocket 11 removes film from the projection aperture 6 at the same predetermined rate as the constant speed input sprocket 12. Film leaving the film transport is taken up by the film take-up system (not shown).

In one embodiment, the rotor 2 moves a counter-clockwise direction and, as shown in FIG. 1, film 10 from film loop 20 in gap 29 is placed onto the input registration pin 15 through a perforation in the film. This is a critical moment in the film advance cycle because the sudden impact of the pin on the edge of a film perforation can cause considerable stress on the edge of the film 10 and can lead to premature wear and destructive failure of the film. When large format film is being transported the impact of the film on the pin becomes more damaging because of the larger film frame size and higher linear film speeds that occur when running at typical projection frames rates of 24 frames per second. In the time leading up to the point that the film 10 impacts the input registration pin 15, the variable speed input feed sprocket 13 reduces the film's 10 linear speed well below the linear film speed that the constant input sprocket 12 advances the film. This can avoid damaging the film 10 when it impacts the input registration pin 15. With conventional large format rolling loop film transport systems, the film approaching the input registration pin (s) is intercepted by deceleration cam pins with each frame advance to reduce the film's speed prior to impacting the input registration pin. The film transport system of one embodiment of the present invention uses the variable speed input feed sprocket 13 to control the film's linear speed while maintaining contact with the film perforations throughout the film frame advance cycle. This is different then the conventional mechanical rolling loop film transport in which contact with the film perforation by the deceleration cam only occurs during the film deceleration before the film perforation engages onto the input registration pin(s).

Once the film 10 impacts the input registration pin 15, the film 10 is constrained along its length between the input registration pin and the sprocket teeth of the variable speed input feed sprocket 13. The film 10 is further constrained laterally along this length by the edges of the inner guide 4, outer guide 3, input stator segment 5, aperture block assembly 7, and rotor 2. These constraints ensure that the additional film fed by the variable speed input feed sprocket 13 towards rotor 2 cause a new film loop to form in rotor gap 19 that is now in the correct position to receive the next film loop. During the moment of forming a new film loop in gap 19 pressurized air is directed laterally by the air jet assembly 17 towards the film loop to discourage and offset the tendency of the film to bend longitudinally. The film 10 moving away from the output registration pin 16 in loop 18 in rotor gap 39 collapses in size as the constant speed output sprocket 11 advances the film 10 out of the film transport 1.

In FIG. 2, rotor gap 29 with film loop 20 is swept across the projection aperture. Integral with each rotor gap is a shutter (not shown) that blocks the light path through the film 10 as the rotor gap 29 moves across the projection aperture 6. The variable speed input feed sprocket 13 then begins to increase the film's 10 linear film speed as the new film loop 21 in gap 19 begins to increase in size. The film loop 18 in rotor gap 39 continues to decrease in size as rotor gap 39 moves towards the constant speed output sprocket 11.

In FIG. 3, the rotor gap 29 has passed the projection aperture 6 and laid the next film frame across the aperture. As film loop 20 moves across output registration pin 16 the film is lifted off the output registration pin 16 and the film at the trailing end of film loop 20 is placed onto the output registration pin 16 via a film perforation. The timing of loop 20 lifting the film 10 off the output registration pin 16 occurs as the film loop 18 in the rotor gap 39 becomes fully depleted allowing the constant speed output sprocket 11 to continue to advance the next film frame out of the film transport system 1. The variable speed input feed sprocket 13 continues to increase the film's linear speed as the new film loop 21 in gap 19 grows. The film's 10 linear speed is then decreased as the film loop 19 approaches the input registration pin 15.

The variable speed input feed sprocket 13, during a portion of one film frame advance cycle, advances the film 10 at a rate slower than the rate the constant speed input sprocket 12 advances the film 10. On the remaining portion of the same film frame advance cycle, the variable speed input feed sprocket 13 advances the film 10 at a rate that is faster than the rate the constant speed input sprocket 12 advances film. The differences in the film advancing rates of these two sprockets will result in a small, but varying amount of excess film. This film forms a shallow, fluctuating film loop between these two sprockets. A loop gap cavity 14 between the outer guide 4 and the inner guide 3 may be included in the film transport system 1 to accommodate this fluctuating loop. In one embodiment, the average film advancing speed over time for the variable speed input feed sprocket 13 equals the constant film advancing speed of the constant speed input sprocket 12. Therefore, the maximum and minimum film loop size in the loop gap 14 is limited to what is needed for differences in film speed between the two sprockets that occur within a single frame advance cycle.

The film transport system of one embodiment of the present invention has timing relationships between the rotating film advancing parts (for example, the input feed sprocket 12, the variable speed input feed sprocket 13, the output sprocket 11, and the rotor 2) that are interconnected electronically and controlled by software. This enables the timing to be easily adjusted when a projection system including the film transport system is in operation. In conventional film loop advancing systems, the relationship between the rotating film advancing parts are mechanically interconnected and are not easily adjusted, so that timing cannot be changed easily or at all when the projection system is in operation.

The film transport system of one embodiment of the present invention provides the ability to adjust the variable speed input feed sprocket to maximize film steadiness of the film frame in the projection aperture. This may minimize film wear and extend print life. Adjusting the variable speed input feed sprocket helps facilitate film loop formation in the rotor gap. FIGS. 5, 6 and 7, 8 and 9 illustrate three different film speed profiles associated with the variable speed input feed sprocket 13 to describe the effect these profiles can have on the film and its performance in the film transport system.

Figure 5:
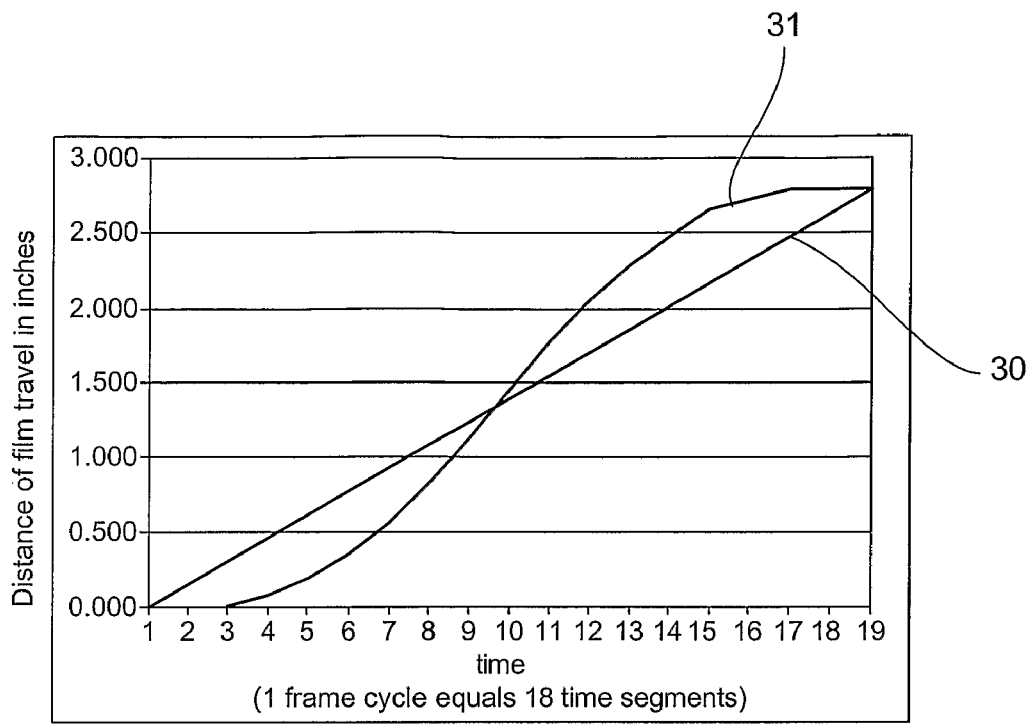
FIG. 5 is a graph illustrating the cumulative distance film advanced during one frame advance cycle by the variable speed input feed sprocket and the constant speed input sprocket as a function of time in one speed profile embodiment.

FIG. 5, for a four gap, 70 mm 15 perforation projection system of one embodiment of the present invention, features two plots showing the cumulative distance in inches that the film is advanced for one 15 perforation film frame versus time in $\frac{1}{18}^{th}$ increments of one film frame advance cycle. Plot 30 shows the amount of film that is advanced by the constant speed input sprocket 12 being constant at 67.32 inches per second. Plot 31 shows the amount of film being advanced by the variable speed input feed sprocket 13. In both cases, the amount of film that is advanced is the same at the end of one film frame advance. In the case of plot 31, the film has traveled a greater distance in the middle portion of the last half of the frame advance cycle and has come to a gradual full stop prior to the end of the film frame advance cycle.

Figure 6:
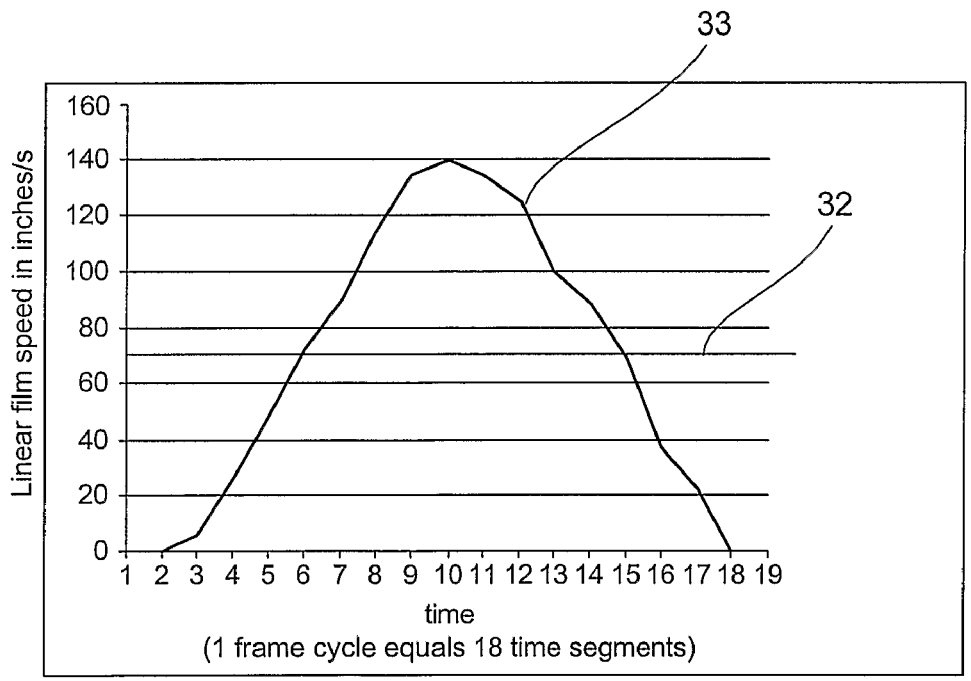
FIG. 6 is a graph illustrating the speed of the film being advanced by the variable speed input feed sprocket and the constant speed input sprocket as a function of time during one frame advance cycle in one speed profile embodiment.

FIG. 6 depicts the instantaneous speeds of the two plots 30 and 31 of FIG. 5. Plot 32 depicts the constant linear film speed of 67.32 inches per second associated with film moved by the constant speed input sprocket 12. Plot 33 reveals a wide variation in linear film speed of the film advanced by the variable speed input feed sprocket 13 over one film frame advance cycle. Plot 33 has a maximum linear film speed of about 140 inches per second at mid cycle and a minimum of 0 inches per second at both the start and end of the frame advance cycle. In both cases, the average speed of the two plots 32,33 equals 67.32 inches per second.

Figure 7:
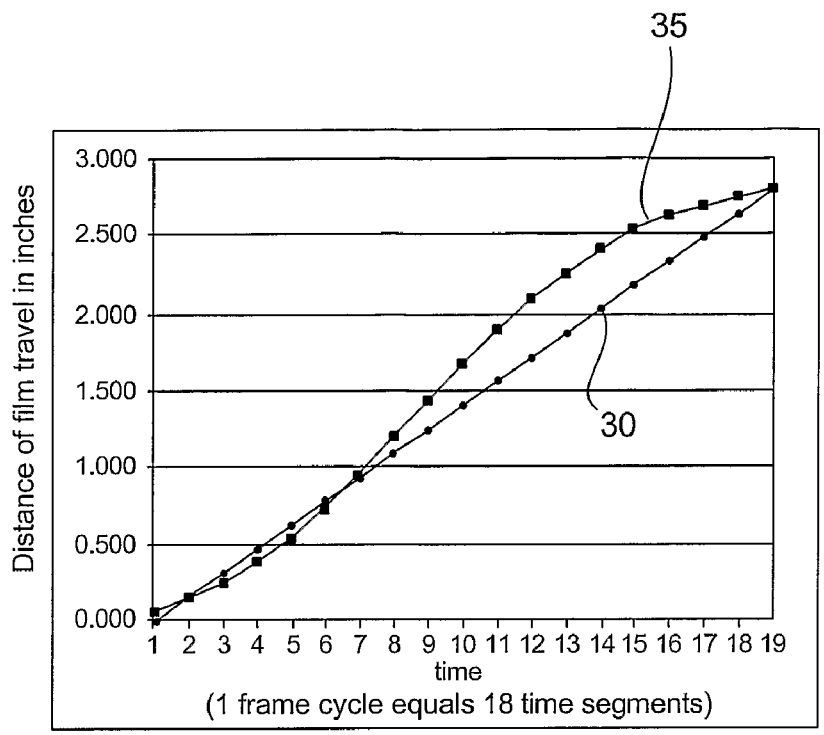
FIG. 7 is a graph illustrating an alternate profile of the cumulative distance film is advanced during one frame advance cycle by the variable speed input feed sprocket and the constant speed input sprocket as a function of time in a second speed profile embodiment.
Figure 8:
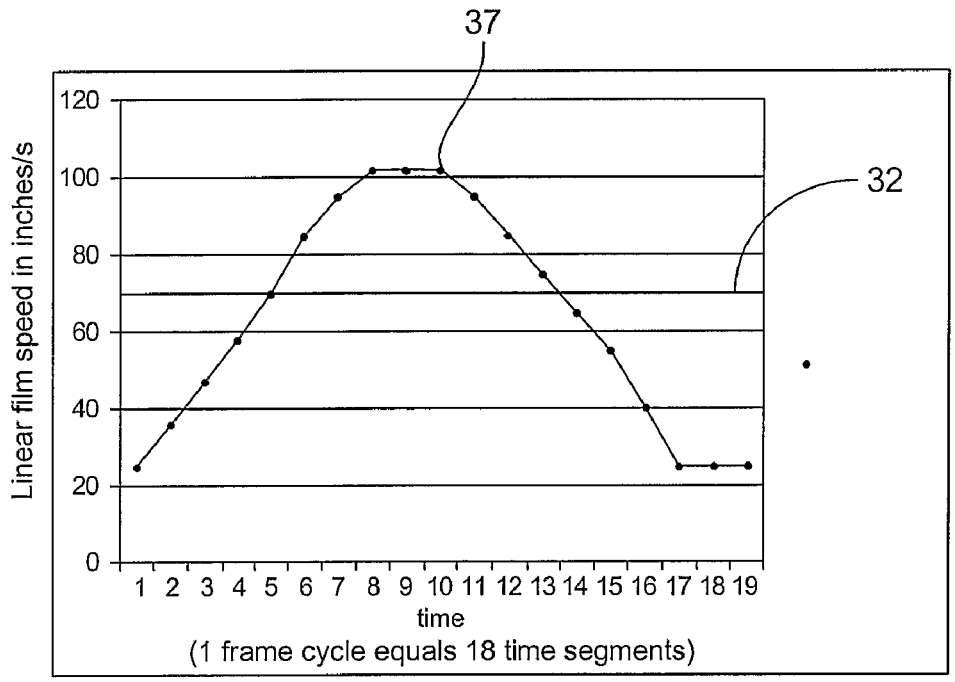
FIG. 8 is a graph illustrating an alternate profile of the speed of the film being advanced by the variable speed input feed sprocket and the constant speed input sprocket as a function of time during one frame advance cycle in a second speed profile embodiment.

FIGS. 7 and 8 are similar to FIGS. 5 and 6, but depict another possible variable speed input feed sprocket linear film speed profile. In this example, the linear film speed of the variable speed input feed sprocket 13 plot 37 at mid-cycle is reduced to about 100 inches per second, but is about 25 inches per second at the end of the cycle. Plot 30 again shows the amount of film that is advanced by the constant speed input sprocket 12 being constant at 67.32 inches per second. There are advantages and disadvantages to both of the speed profiles illustrated in FIGS. 6 and 8. Plot 33 in FIG. 6 has an advantage in that the film comes to a gradual complete stop before the film is laid onto registration pin 15 reducing the amount of the initial impact between the registration pin and the film perforation to a minimum. This speed profile minimizes film wear, but the disadvantage is that later in the film advance cycle the film is advanced before becoming fully seated against the input registration pin. This means that the film does not settle to a stable position until later. This contributes to increasing image unsteadiness in the projection aperture. There is also a high acceleration period followed by a high deceleration period in the film advance cycle. During the high acceleration period the film is pushed up against the input registration pin with more force that can cause the film perforation edge to become slightly deformed. During the deceleration period, the film perforation edge becomes less deformed. These distortions in the film perforation on the input registration pin also cause slight film frame shifts with respect to the projection aperture while the film image is being projected. These factors contribute to unsteadiness in the projected image.

Another disadvantage for the speed profile illustrated in FIG. 6 is that the greater variation in sprocket speed requires the sprocket motor to accelerate and decelerate quickly, increasing the load on the sprocket servo drive motor. Plot 37 in FIG. 8 has an advantage in that the speed of the variable speed input feed sprocket is never 0 inches per second. This may make it easier to form film loops at the beginning of the film advance cycle, but has the disadvantage the film perforation initially impacts the input registration pin with greater force. This leads to film perforation wear over time that in turn and contributes to film bounce and unsteadiness of the image during projection.

Figure 9:
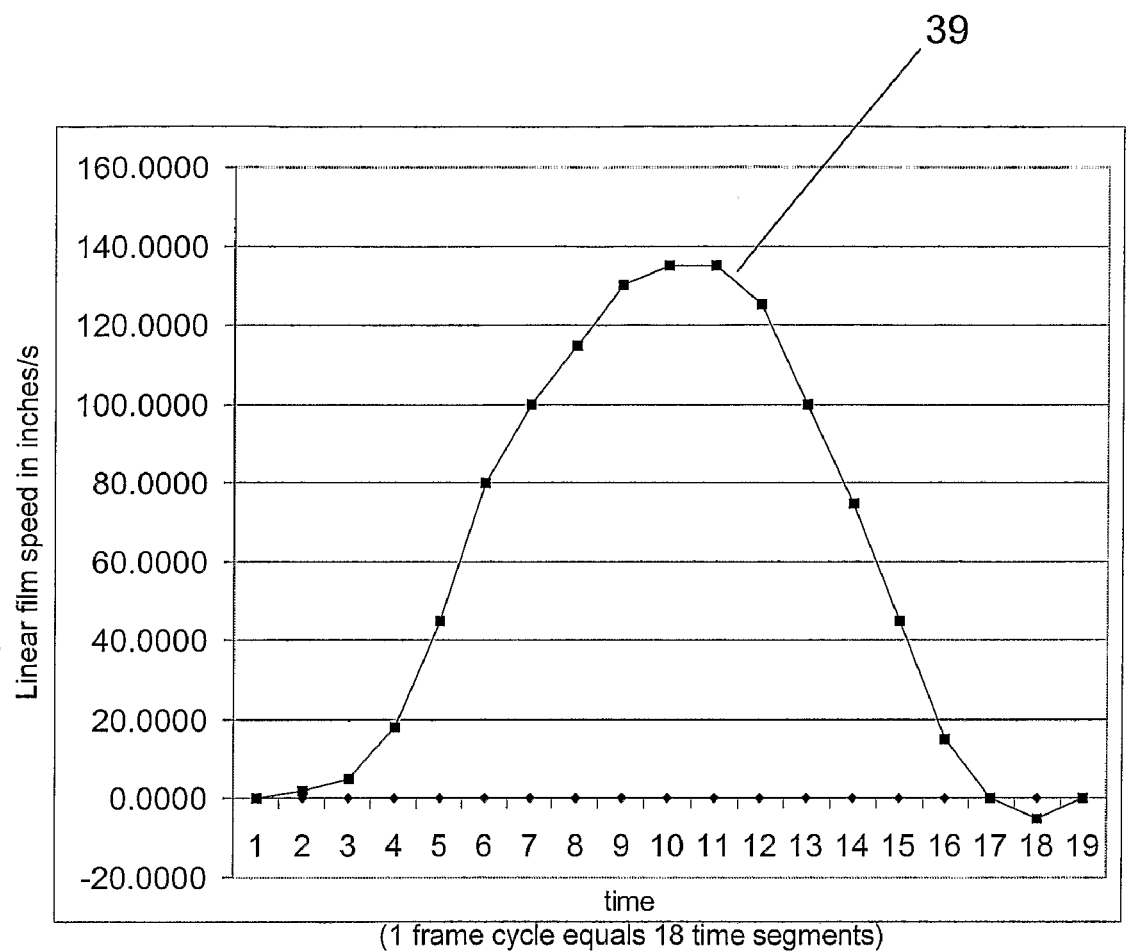
FIG. 9 is a graph illustrating an alternate profile of the speed of film being advanced by the variable speed input feed sprocket as a function of time during one frame advance in a third speed profile embodiment.

FIG. 9 depicts another illustrative variable speed input feed sprocket linear film speed profile. In this example the linear film speed of the variable speed input feed sprocket plot 39 at the end of the film advance cycle goes negative for a brief moment causing the film to be pulled back a short distance. This action has been found to be particularly useful in improving the degree of certainty with which the film perforation properly engages onto the input registration pin. There are several factors that can lead to improper engagement of the film perforation onto the input registration pin. Humidity effects film curl and film friction characteristics that in turn influences how film performs in the rotor/stator gap. Another factor is any speed profile abnormalities in the variable speed input feed sprocket as a result of commanded high accelerations. The profile of the air jet from the air jet assembly 17 can influence the film in the rotor/stator gap. Coatings on the film, such as Photoguard, or whether the film has the emulsion facing inwards or outwards may also influence the performance of film in the rotor/stator gap. Another influence on the film dynamics in the rotor/stator gap is created when the variable speed input feed sprocket pushes film into the rotor/stator gap causing the film to ripple in the gap. This film rippling or snaking effect can be explained when observing the behavior of the film in the rotor/stator film gap as the film loop is growing. As the film loop grows, the film is constrained along its length between the input registration pin 15 and by the sprocket teeth of the variable speed input feed sprocket 13. The film is also constrained along its length by the edges of the inner guide 4, outer guide 3, input stator segment 5, aperture block assembly 7, and rotor 2. Although the film is constrained by various parts there is still a gap in this film transport path in the order of a few film thicknesses. This gap allows film splices to pass through the projection system film transport without any physical restrictions that could otherwise cause film breakage or damage. The disadvantage of this gap is that film can take on rippling formations between the rotor 2 surface and the input stator segment 5 surface. Film snaking profiles can also effect the position of the film perforation that is meant to engage with the input registration pin 15. The variable speed input feed sprocket speed profiles can be adjusted to deal with film perforation and registration pin engagement problems. In one embodiment, a speed profile may be a combination of the above speed profile embodiments. In one embodiment, the variable speed input feed sprocket speed may be changed while the projection system is running to deal with the passing of film splices, or films with different protective coatings or emulsion orientations. The speed profiles can also be adjusted to suit a particular film transport and a particular film format.

In one embodiment, the speed profile for variable speed input feed sprocket 13 is controlled by the motor drive 123, which receives control signals from the film transport system controller 150. These control signals can be determined based on information received from the positional feedback sensor 113 and other feedback sensors 111, 112, 113 received by the film transport system controller 150. The primary advantage is that the variable speed input feed sprocket 13 speed profile changes can be implemented with relatively simple software parameter changes to the motor drive 123 from the film transport system controller 150. In one embodiment, the film transport system controller 150 can be updated by a user via a standard user interface (not shown). This can help to avoid the need to refit mechanical parts to achieve alternate speed profiles, as is generally the case with the mechanically controlled film advancing projection systems. Testing can be carried out quickly and these changes can be easily implemented in the field.

Figure 10A:
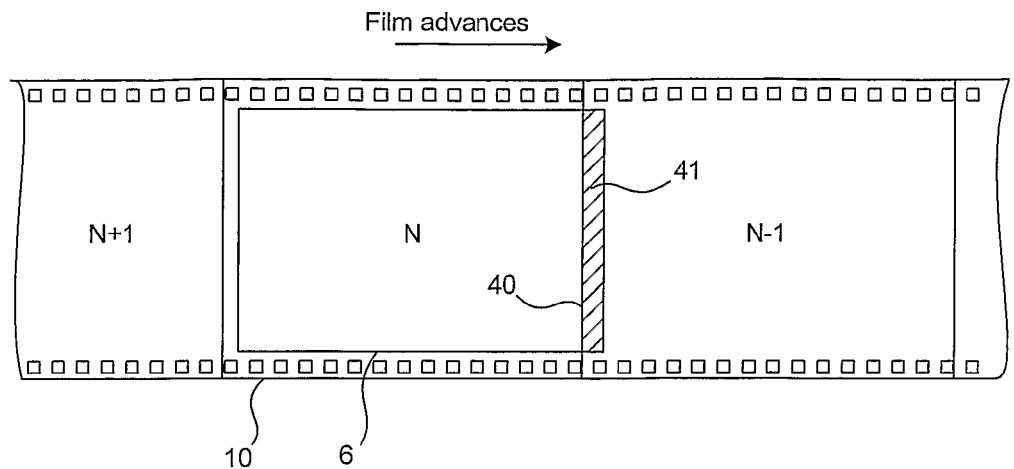
FIG. 10 is graph illustrating the real time framing adjustment at the projection aperture of one embodiment of the film transport system.
Figure 10B:
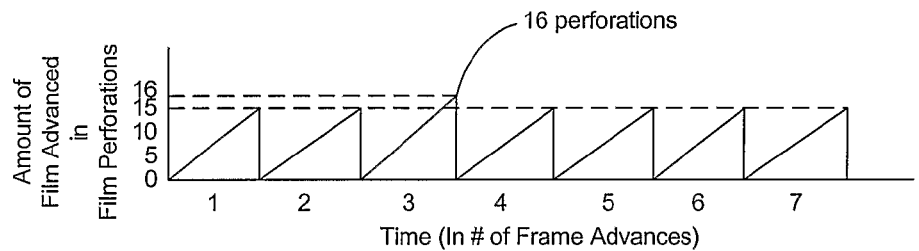
Figure 10C:
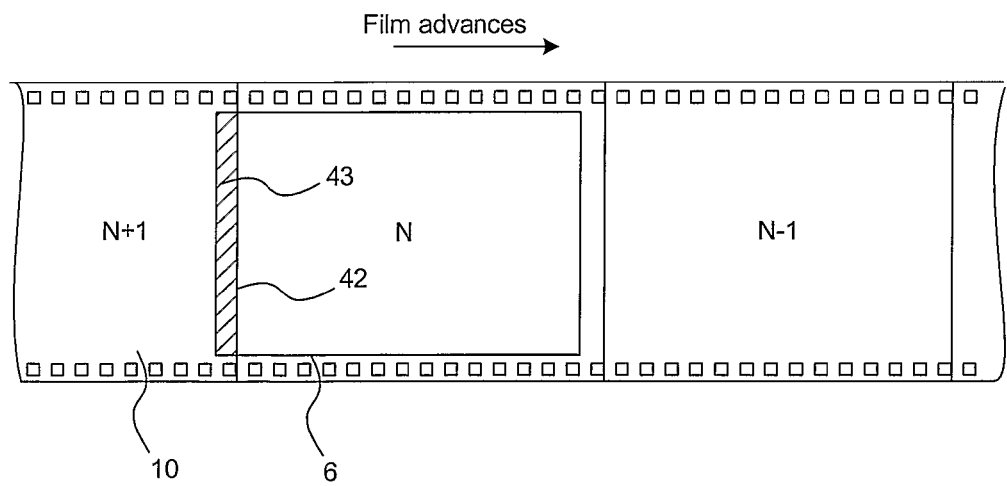

A further advantage of the film transport system of one embodiment of the present invention is the ability to advance the film by one film frame and one frame perforation within one film advance cycle as illustrated in FIG. 10. This feature is particularly useful when improper film splicing occurs and results in a film strip that becomes improperly registered, or shifted, some distance either to the right or left of the projection aperture. When this happens a portion of two adjacent frames are simultaneously projected onto the screen as illustrated by area 41 in FIG. 10a and area 43 in FIG. 10c. This may be highly objectionable to a viewing audience, and with conventional systems can literally be a show "stopper" since the film transport had to be stopped to correct the misalignment. This potential problem is simply addressed by the film transport system of one embodiment of the present invention by applying a new speed profile to each of the film advancing sprockets in the correct sequence such that a single frame of 14 or 16 perforations is advanced through the film transport. The new speed profile can be implemented while the film transport remains in operation thereby quickly overcoming the objectionable viewing condition. FIG. 10a illustrates a condition where a film is registered one perforation too soon and the frame N in projection aperture 6 features 14 perforations of frame N and one perforation of frame N−1 and the film frame line 40 is in the gate. FIG. 10b illustrates the corrective adjustment in a series of frame advance cycles. The film advancing sequence to correct the problem starts with the constant speed input sprocket 12 and the variable speed input feed sprocket 13 advancing one 16 perforation film frame into the rotor 2 gap. Frame 3 in FIG. 10b illustrates the one 16 perforation film frame being advanced. The next film frames advanced by these two sprockets are 15 perforation film frames as shown by frame 4 onwards. When the 16 perforation film frame advances past the output registration pin the speed profile of the constant speed output sprocket changes to advance the one 16 perforation film frame out of the film transport and then reverts back to advancing 15 perforation film frames. For illustrative purposes the amount of film advanced with in each frame advance in FIG. 10b is shown as being linear with time but there are a variety of other profiles that will achieve the same result. In a situation where a filmstrip is improperly registered one perforation too late as depicted in FIG. 10c, the frame in the projection aperture will feature 14 perforations of frame N and one perforation of frame N+1 and frame line 42 will be in the aperture. This misalignment can be remedied by a speed profile routine stored in software that advances 16 perforations of film for 14 consecutive film advance cycles and then reverts back to the usual 15 perforations advanced per cycle. It is also possible to achieve the same result by retarding a single film advance by one film frame perforation. These examples represent the extremes of filmstrip misalignments; misalignments between these two extremes can be remedied in essentially the same manner.

Another advantage of the film transport system of one embodiment of the present invention is that it is easy to change the film transport to advance other standard film formats that have a different perforation count per frame, such as 10 perforation, 70 mm or 8 perforation, 70 mm film formats. This may be done by simply changing the amount of film advanced in each film advance cycle by the constant speed input sprocket 12, the constant speed output sprocket 11, and the variable speed input feed sprocket 13. For example, a frame of 70 mm film having 10 perforations could be implemented by adjusting the speed profile of the variable speed input feed sprocket and by reducing the speeds of the input and output sprockets to reflect the new linear film speed, in this case 44.88 inches per second. The rotor speed may not need to be changed since its rotational speed is generally related to the system frame rate of 24 frames per second regardless of the size of each frame.

The three film advance sprockets 11, 12, 13, and the rotor 2 can be given their respective appropriate speed profile for prolonged periods of time that would rewind the film from the take up spool to the supply spool through the film transport as a part of regular projection system operations.

Figure 11A:
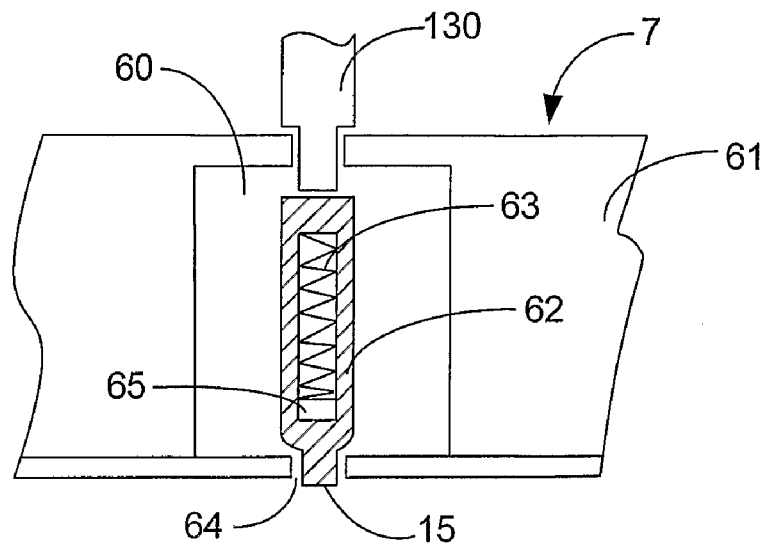
FIG. 11a is a cross sectional top view and FIG. 11b is an isometric view of the aperture block assembly with a registration pin assembly as viewed from the film transport path side.
Figure 11B:
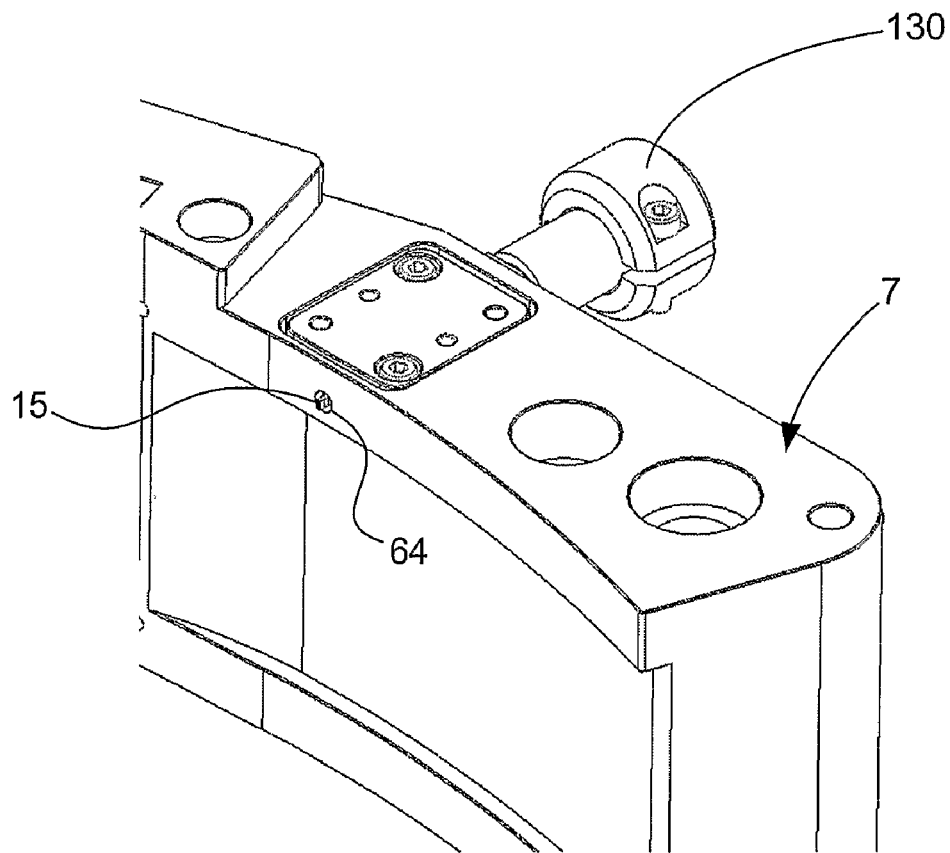

A feature of the film transport system of one embodiment of the present invention to allow this rewind capability is a registration pin or pins that can be moved out or retracted from the film transport path. In one embodiment, the registration pin's up, down and sideways motion is not be permitted to ensure the function of holding the film frame steady in the projection aperture during film image projection. FIG. 11 shows an illustrative design of a registration pin assembly with the features described above. FIG. 11a illustrates an input registration pin 15, but is equally applicable to an output registration pin. The registration pin assembly 50 includes a pocket 60 within the upper surface plate 61. Plate 61 is positioned on top of the aperture block. In one embodiment, there are two pockets, one at the input registration pin 15 and one at the output registration pin 16 in the aperture block assembly 7 as shown in FIG. 1. The pocket 60 houses a slotted registration pin base frame 62. At one end of the registration pin base frame 62 is a tip having a rectangular cross section which functions as the registration pin 15. A hole 64 in upper surface plate 61 is collinear with pin 15 and permits passage of pin 15 into and out of the gap between aperture block assembly 7 and rotor 2. In one embodiment, pin 15 does not move laterally when impacted by the film, as this will contribute to film image unsteadiness. A rectangular stud 65 that is integral with the bottom surface of pocket 60 is dimensioned to fit within the slot of the registration pin base frame 62. A spring 63 has one end in contact with stud 65 and the other end in contact with the inner back wall of the slot of the registration pin base frame 62. Spring 63 biases registration pin base frame 62 in a retracted position so that the registration pin 15 does not extend into the gap between aperture block assembly 7 and rotor 2. During normal projection system operation solenoid 130 is energized and urges registration pin base frame 62 towards rotor 2 against the bias of spring 63. When rewinding film through the film transport system, or in the event of a film tail out or film crash, power to solenoid 130 is interrupted and pin 15 is automatically retracted fully within pocket 60. FIG. 11b is an isometric view of the aperture block assembly with a registration pin assembly as viewed from the film transport path side.

The retraction of the registration pins also allows auto-film loading of the film transport. Auto loading may be defined, in one example, as the film transport system of the projection system being able to automatically thread film through the film transport path such that film appears at the output of the film transport system. As part of the auto-loading, the film transport system subsequently positions the start film frame in the projection aperture, sets the film loops, and then waits for the presentation start command to be given. The only manual actions are typically to place the film onto the film transport system input sprockets before initiating the auto-loading and to thread the film from the film transport system to the film take-up system after the film has been auto-threaded through the film transport system.

An auto loading sequence involving the retraction of the registration pins according to one embodiment is as follows. Referring to FIG. 1, the projectionist places the film so that the perforations are engaged on the sprocket teeth of sprocket 12 and 13 of film transport system 1. The projectionist initiates the auto load command on the film transport system to start the sequence that automatically threads film through the film transport film transport path. Rotor 2 moves to a predetermined position allowing the film to be passed into and around the rotor film transport path reliably while the input registration pin 15 and the output registration pin 16 are in the retracted position. The sprockets 12 and 13 advance a predetermined amount of film into the rotor 2 so the film 10 is just short of reaching sprocket 11. To ensure partial film loops have not formed in any of the rotor gaps the film is pulled back a few frames by sprockets 12 and 13. This action causes any partial film loops that may have formed in the rotor gaps to collapse. Now film is advanced to and past output sprocket 11 by a few film frames. The sprocket motors at this time become free to rotate to allow the projectionist to easily pull film from the film transport to load it onto the take up spool. At this time, the projectionist can align the film frame line to a predetermined mark or the system can be designed so that a sensor detects the frame line and feeds this indication back to the control system. With the film frame line position established and film threaded onto the film supply and take-up system it is now possible that the projection system rotor 2 motor, sprocket 12 and 13 motors can be commanded to jog by the projectionist to get the film start frame to the start mark at the film transport input.

The next sequence of getting the film start frame into the projection aperture 6 and setting up the film loops in the rotor gaps is initiated with another command by the projectionist. When given, the rotor 2 goes to a predefined position, sprocket 12 and 13 rotate to a predetermined position to allow the input registration pin 15 and the output registration pin 16 to engage into the appropriate film perforations. At this time, the registration pins 15, 16 engage, the sprockets 12, 13 and the rotor 2 become phase locked in synchronization with each other and advance the film creating a film loop in a rotor gap. The constant speed output sprocket 11 is held stationary once the registration pins are engaged and the film loop continues to be advanced past the input registration pin 15, past the projection aperture 6, until it just reaches the output registration pin 16. At this moment the constant speed output sprocket 11 becomes locked in synchronization with input sprockets 12 and 13 and rotor 2. The film transport system 1 continues to advance film frames until the pre-positioned start film frame is positioned in the film transport system aperture 6. At this point the film transport system is now waiting for a presentation start command to be given. The sequence described above is one of a number of ways to achieve auto-film loading in the film transport of the present invention.

An advantage of the auto-film loading feature can be that the film transport may no longer need film to be loaded and unloaded from the front of the projection system. This can eliminate the need for a conventional projection system transporter that moves the projection system back from the projection port window to allow the projectionist to perform film unthreading and threading operations. This may provide the option of being able to permanently position the projection system as close as possible to the projection port window in the projection booth. Eliminating the need to move the projection system minimizes the projection system footprint in the projection booth and minimizes the size requirements of the projection booth.

In one embodiment, the center of the rotor 2 may be in line with optical axis of the projection aperture 6 and the input registration pin 15 may be moved further away from the projection aperture than with a conventional film loop projection system using a deceleration cam. This allows the input registration pin 15 to protrude into the rotor beyond the rotor's outer peripheral upper and lower edge of the rotor. This configuration better confines the film on the input registration pin than the situation of the input registration pin as described in conventional small rotor projection systems where the rotor center is offset with respect to projection lens and the curvature of the film support surface in the projection aperture is significantly larger than the radius of the rotor.

Another advantage with the input registration pin being located further away from the projection aperture in the film transport system of one embodiment of the present invention is that this allows more time for the film frame to settle into a stable position prior to the period the film frame is positioned in the projection aperture. This extra time is needed because of settling effects associated with the variable speed input feed sprocket advancing film onto the input registration pin. By improving the way the film is confined on the input registration pin and providing more time for the film to settle on the input registration pin helps contribute to a more steady film image in the projection aperture.

Figure 12:
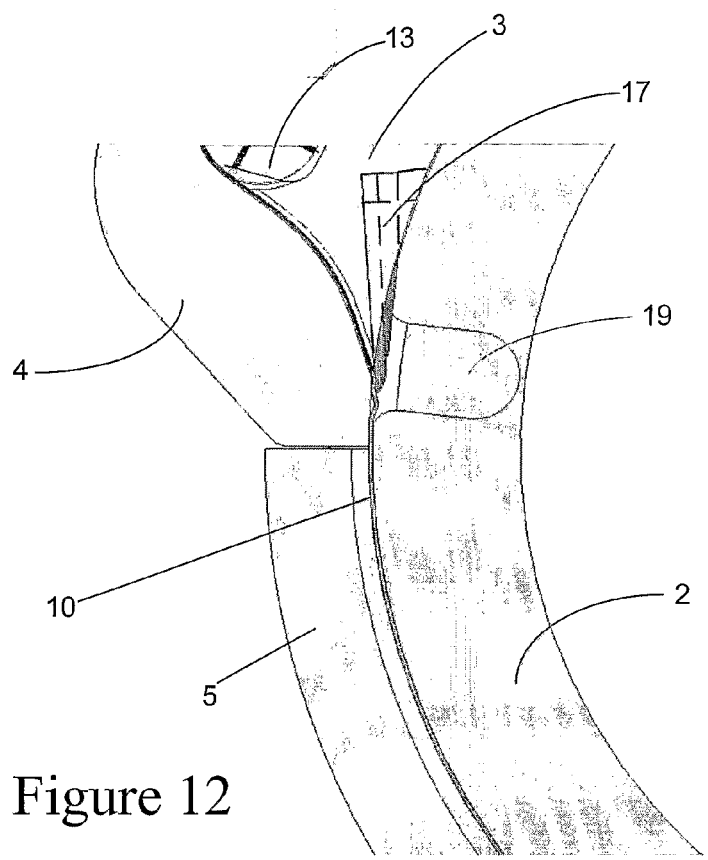
FIG. 12 is a plan view schematic illustrating one embodiment of an air jet system.
Figure 13:
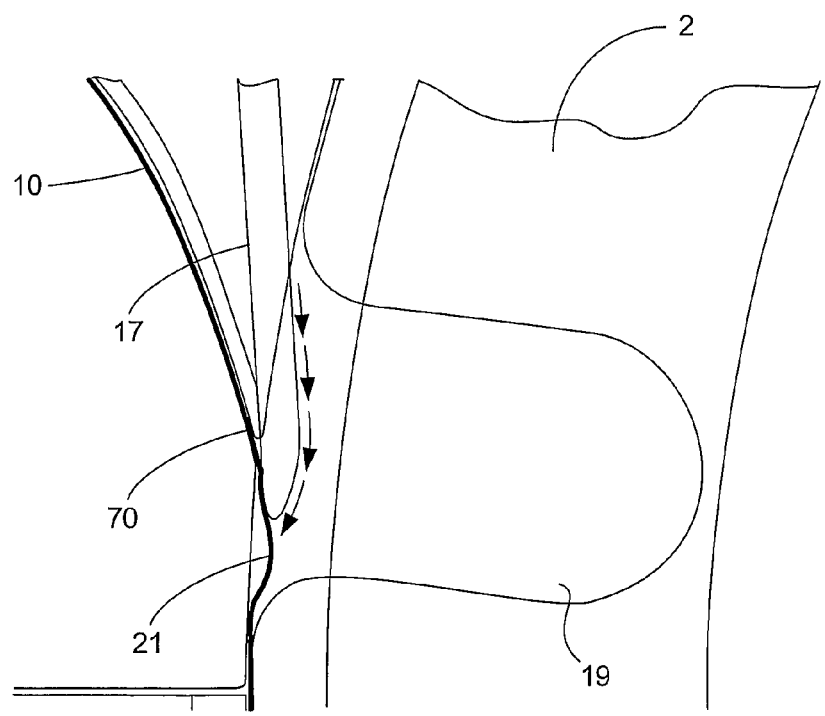
FIG. 13 is a close up plan view of one embodiment of the air jet system.

FIG. 12 shows an illustrative embodiment of the air jet assembly 17 of the film transport system. The air jet assembly 17 is located partially within the inner guide 3 near the point where film 10 is driven by variable speed input feed sprocket 13 towards the gap between the outer guide 4 and rotor 2. FIG. 13 shows the tip of air jet assembly 17 in more detail. The tip extends past the film entry point 70 and within the space defined by the outer circumference of rotor 2. Upper and lower plates define the outer circumference of rotor 2 and the gap between them is of sufficient width to accommodate the intrusion of the tip of air jet assembly 17. The outer surface of air jet assembly tip 17 has a gently curved profile that guides the flow of air towards a precise location on newly forming film loop 21.

The flow of air on the film from the tip of the air jet assembly 17 provides lateral support for the film 10 against the tendency for longitudinal bending or buckling of the film 10 at two critical moments in the film loop forming phase: when film loops are first starting to grow, and when the trailing edge of rotor gaps make first contact with the edges of film 10 of the newly forming film loop. After these two events, the flow of air is stopped until the approach of the next rotor gap and the subsequent initiation of another new film loop. An advantage of the air jet assembly 17 is that airflow can be concentrated and brought to bear precisely where and when it is needed. This may be beneficial when variable speed input feed sprocket 13 is programmed with a speed profile such as profile 33 in FIG. 6 where film loops are slower to initiate than is normally the case.

Figure 14:
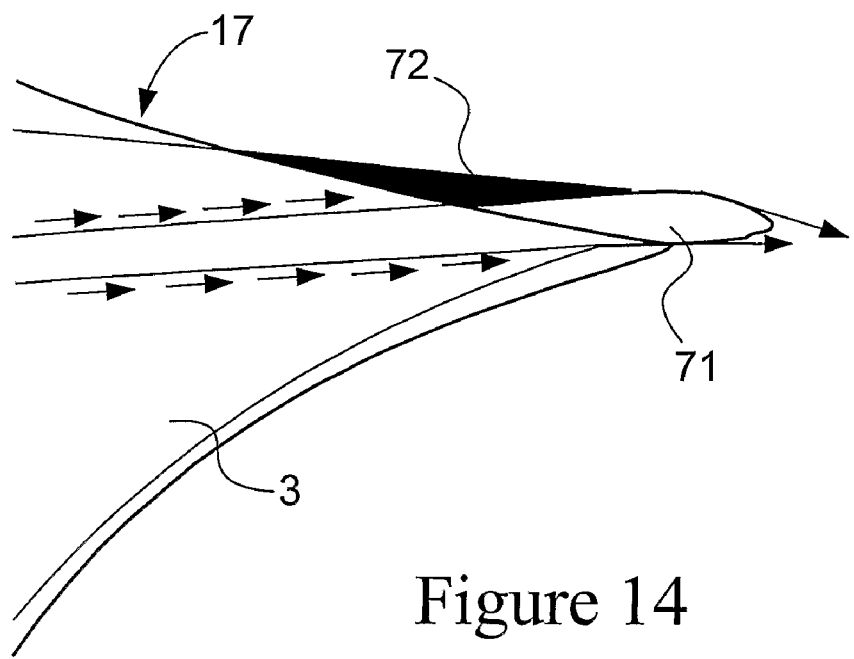
FIG. 14 is a close up profile view of one embodiment of the air jet system.
Figure 15:
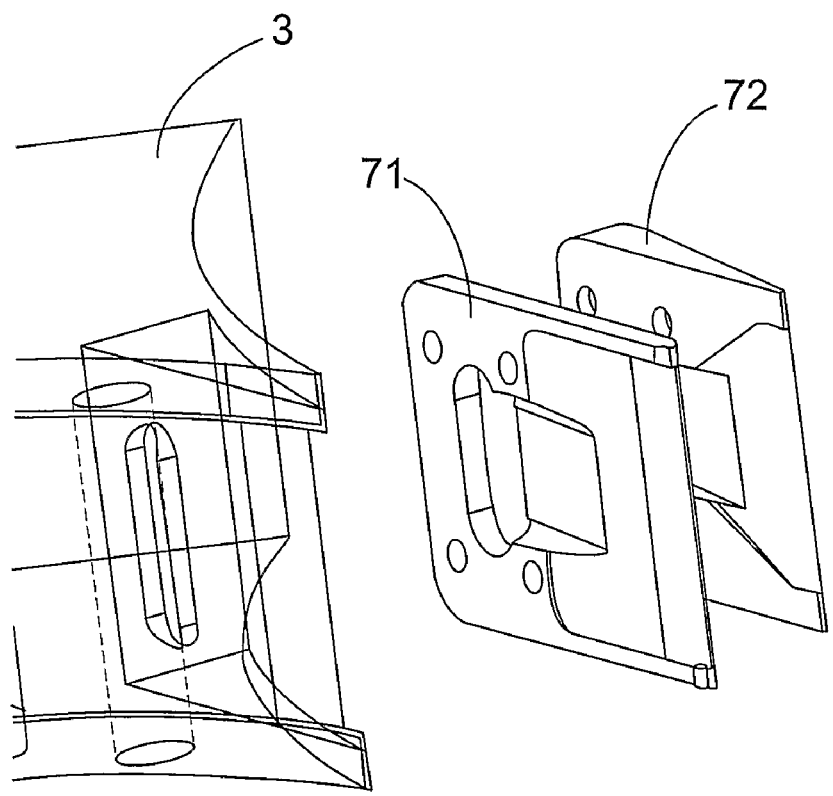
FIG. 15 is an exploded view of one embodiment of the air jet system.

The structure of an illustrative embodiment of the air jet assembly 17 is explained more fully with reference to FIGS. 14 and 15. In FIG. 14, air jet assembly 17 is shown in profile and includes three main elements: inner guide 3, outer air guide plate 71, and inner air guide plate 72. The three elements may be made of aluminum and machined to have a series of channels and pockets allowing air from a regulated air supply to flow through a valve (not shown) via the inner guide 3 and over both surfaces of the outer air guide plate 71. The operation of the air valve can be synchronized with respect to the rotor position to provide a flow of air just before a rotor gap approaches the position where the film loop begins and until the position the new film loop has grown to a sufficiently stable size. The air valve can also be left on for the full period of the film frame advance in situations where improved film dynamics results in more reliable film transport.

FIG. 15 shows an exploded view of the parts describe above revealing the co-operating surfaces and pockets that define the route the air travels. The shape of both surfaces of the outer air guide plate 71 and the rate of air flow over these surfaces is designed to create an air flow condition which reproduces the well known Coanda effect: the tendency of smoothly flowing fluids to stay attached to surfaces even when they undergo curvature. This effect makes it possible to precisely direct air flow towards the film loop during the film loop forming phase that overcomes the tendency of the film to experience longitudinal bending which occurs when the film is only supported at its edges during the loop forming process.

While the above description contains many specifics, these specifics should not be construed as limitations on the scope of the invention, but merely as exemplifications of the disclosed embodiments. Those skilled in the art will envision any other possible variations that are within the scope of the invention. For example, the film transport system described above is not limited to advancing film for projected images but can also be applied to advancing film to capture images as in a camera. Additionally, the registration pin or pins of the type described in the film transport system that are controlled by a programmable controller may be used in conjunction with other film transports that are not film loop advancing transports, such as conventional 35 mm and 70 mm electronically controlled intermittent film sprocket film advancing systems.

That which is claimed:

1. A film transport system comprising:
a film transport path for transporting film;
an input drive assembly for advancing film through the film transport path;
an output drive assembly for advancing film out of the film transport path;
an aperture positioned in the film transport path;
at least one registration pin capable of engaging at least one perforation in the film to secure a portion of the film in the aperture, wherein the at least one registration pin is capable of retracting to a non-engaging position; and
a controller for controlling the retraction of the at least one registration pin.

2. The film transport system of claim 1, wherein the input drive assembly comprises a variable speed drive assembly.

3. The film transport system of claim 2, wherein the variable speed drive assembly comprises at least one variable speed feed input sprocket, wherein the variable speed feed input sprocket is capable of controlling a speed of the film towards the at least one registration pin.

4. The film transport system of claim 1, wherein the input drive assembly comprises at least one input feed sprocket and the output drive assembly comprises at least one output sprocket.

5. The film transport system of claim 1, wherein the film transport system is used in a projection system.

6. The film transport system of claim 1, further comprising a rotor having at least one rotor gap, wherein the film forms a film loop in the rotor gap and the rotor gap is capable of moving the film loop.

7. The film transport system of claim 3, wherein the variable speed input sprocket is controlled by the controller.

8. The film transport system of claim 1, wherein when the at least one registration pin retracts to facilitate auto-loading of the film in the film transport system.

9. The film transport system of claim 6, wherein the at least one registration pin is retracted and the film loop collapses to allow movement of the film in the reverse direction to rewind the film back through the film transport system.

10. A film transport system comprising:
a film transport path for transporting film;
an input drive assembly for advancing film through the film transport path, wherein the input drive assembly comprises (i) a variable speed drive assembly, (ii) a variable speed sprocket, and (iii) a constant speed sprocket;
an output drive assembly for advancing film out of the film transport path;
an aperture positioned in the film transport path;
at least one registration pin capable of engaging at least one perforation in the film to secure a portion of the film in the aperture;
a rotor having at least one rotor gap, wherein the film forms a film loop in the rotor gap and the rotor gap is capable of moving the film loop to engage and disengage the film from the at least one registration pin;
a controller for controlling a speed profile of the variable speed sprocket to control a speed at which the film is fed into the rotor gap to form the film loop; and
a loop gap between the variable speed sprocket and the constant speed sprocket that is sized based on a difference in film speed between the variable speed sprocket and the constant speed sprocket.

11. The film transport system of claim 10, wherein the at least one registration pin is capable of retracting to a non-engaging position.

12. The film transport system of claim 10, wherein at least one of the variable speed sprocket or the constant speed sprocket is an input feed sprocket and the output drive assembly comprises at least one output sprocket.

13. The film transport system of claim 10, wherein the speed profile of the variable input drive assembly is capable of being adjusted during operation of the film transport system.

14. The film transport system of claim 13, wherein the speed profile of the variable input drive assembly is configured to be changed to accommodate a changing condition of the film.

15. The film transport system of claim 10, wherein the film transport system is capable of transporting film at different frame rates.

16. The film transport system of claim 10, wherein the film transport system is capable of transporting a plurality of film formats.

17. The film transport system of claim 10, wherein a film frame position in the aperture is capable of being adjusted by at least one film perforation increment during operation of the film transport system.

18. The film transport system of claim 10, further comprising an air jet system comprising:
an airflow tip for directing air;
at least one air guide surface;
a valve for controlling the flow of air through the air flow tip, wherein the air from the air flow tip is directed at least in part by the air guide surface onto the film to prevent at least in part longitudinal bending of the film during the formation of the film loop.

19. The film transport system of claim 10, wherein the rotor has a radius that is less than a curvature of a film support surface of the aperture and a center of the rotor is in line with an aperture optical axis center line, and wherein the at least one registration pin extends beyond an outer peripheral surface of the rotor.

20. The film transport system of claim 10, wherein the controller is configured for reducing a force with which the at least one perforation in the film impacts the least one registration pin.

21. A method of auto loading film in a film transport system, comprising:
  engaging the film with an input drive assembly;
  threading film through a film transport path automatically by the input drive assembly;
  receiving the film at an output drive assembly;
  automatically engaging at least one perforation of the film by at least one registration in extending into the film transport path from a retracted position with respect to the film transport path; and
  automatically creating at least one film loop by the input drive assembly.

22. The method of claim 21, further comprising automatically positioning a film start frame into an aperture of the film transport system.

23. A film transport system comprising:
  a film transport path for transporting film;
  an input drive assembly for advancing film through the film transport path, wherein the input drive assembly comprises (i) a variable speed input drive assembly, (ii) a variable speed sprocket, and (iii) a constant speed sprocket;
  an output drive assembly for advancing film out of the film transport path;
  an aperture positioned in the film transport path;
  a film loop transport in which a loop of film is capable of forming, the film loop transport being configured for moving the loop of film;
  at least one registration pin capable of engaging at least one perforation in the film to secure a portion of the film in the aperture;
  a controller for controlling a speed profile of the variable speed sprocket to control a speed at which the film is fed into the film loop transport; and
  a loop gap between the variable speed sprocket and the constant speed sprocket that is sized based on a difference in film speed between the variable speed sprocket and the constant speed sprocket.

24. The film transport system of claim 23, wherein the film loop transport is a rotor with at least one rotor gap.

25. The film transport system of claim 23, wherein the film loop transport is a linear loop transport.

26. The film transport system of claim 23, wherein the controller is configured for reducing a force with which the at least one perforation in the film impacts the least one registration pin.

* * * * *